United States Patent

Mostyn, Jr.

[15] 3,678,505
[45] July 18, 1972

[54] SIMULTANEOUS LOGARITHMIC CONVERSION AND DIGITAL DISPLAY APPARATUS

[72] Inventor: William T. Mostyn, Jr., Waco, Tex.
[73] Assignee: Musi Conics International, Inc., Waco, Tex.
[22] Filed: Nov. 9, 1970
[21] Appl. No.: 87,697

[52] U.S. Cl. .................................340/347 AD, 324/99
[51] Int. Cl. .....................................................H03k 13/20
[58] Field of Search...............324/99; 340/347; 235/183

[56] References Cited

UNITED STATES PATENTS

| | | | |
|---|---|---|---|
| 3,303,493 | 2/1967 | Charbonnier | 340/347 AD |
| 3,543,152 | 11/1970 | Niedereder | 324/99 |
| 3,258,764 | 6/1966 | Muniz et al. | 340/347 NT |
| 3,493,963 | 2/1970 | Schluter | 340/347 AD |
| 3,411,153 | 11/1968 | Steele | 340/347 AD |
| 3,564,406 | 2/1971 | Henderson et al. | 324/99 |
| 3,506,818 | 4/1970 | Smith | 340/347 X |

*Primary Examiner*—Thomas A. Robinson
*Assistant Examiner*—Charles D. Miller
*Attorney*—Arnold, White & Durkee, Tom Arnold, Robert A. White, Bill Durkee and Frank S. Vaden

[57] ABSTRACT

A simultaneous positive or negative logarithm conversion and digital display apparatus utilizing two comparators, one actuated when the exponentially decaying voltage on a capacitor discharging through a shunting resistor reaches the level of a reference voltage and the other actuated when the exponential decaying voltage reaches the level of the measured input signal. A clock generator connected through a gate to a counter provides the means for digitally displaying the logarithmically related time interval during which the counter operates.

5 Claims, 2 Drawing Figures

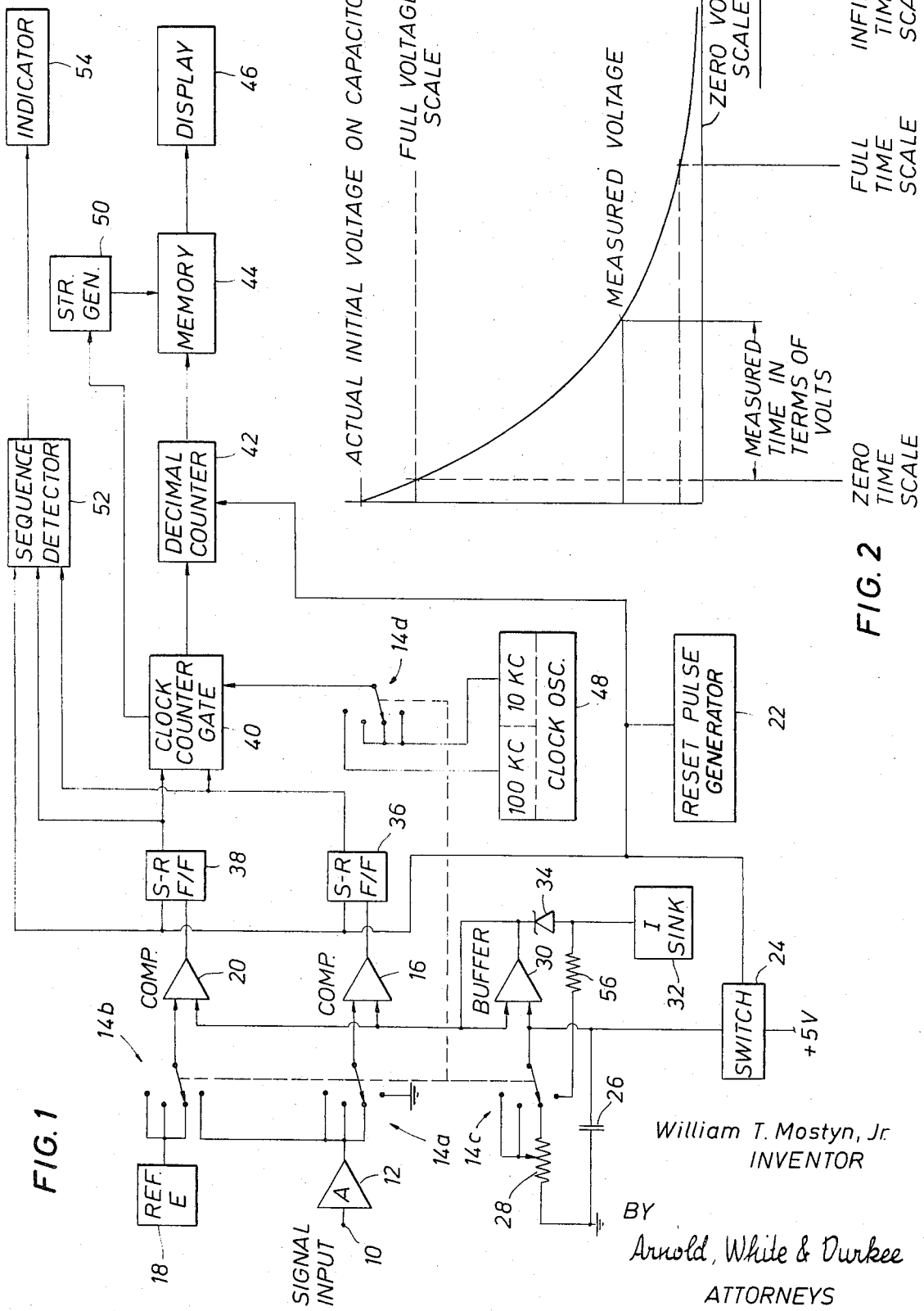

3,678,505

SIMULTANEOUS LOGARITHMIC CONVERSION AND DIGITAL DISPLAY APPARATUS

FIELD OF THE INVENTION

This invention relates to electronic conversion and display apparatus and specifically to apparatus suitable for simultaneously converting an analog measured parameter to a logarithmically related function in digital form.

DESCRIPTION OF THE PRIOR ART

For years practically all metering displays of signal or data was presented for viewing in analog form. The conventional D'Arsonval voltmeter is an example of such metering. Graphically, analog signals have been both presented for momentary viewing on oscilloscopes and preserved on strip recorders.

With the advent of treating signals in incremental segments, which may be characterized broadly as digitizing signals or merely as digitization, it has become both necessary and popular to display signals by showing the actual numerical units or values of the digitized segments. Or, in other words, in some instrumentation and display systems, it has been found desirable to digitally display the measured data, rather than to display the data in analog form.

As is also well known, the linear scale is not always the most expressive or meaningful scale for graphical analysis. For example, in analyzing sound levels it is conventional to compare levels in terms of decibels, rather than in terms of absolute voltage or wattage values. A decibel relationship between signals is a logarithmic relationship. Moreover, because of the magnitude of signal comparisons, it is often desirable to include a scale factor for some signals or measured data which is different from others. That is, the relationship is either compressed or expanded to make the measured data more meaningful. Similarly, the variously scaled negative logarithm is a very meaningful term in colorimetry and spectrophotometry.

By definition, the logarithm $x$ of the number $N$ to the base $b$ is the exponent of the power to which b must be raised to give $N$. That is, $$\log_b N = x \text{ or } b^x = N.$$

Hence, two numbers having a logarithmic relationship also by definition have an exponential relationship. In understanding logarithm "conversion" it may be helpful to think in terms of establishing the exponential relationship between two numbers. Hence, the numerical value of the signal is "converted" to a logarithmic or exponential value with respect to a data base or reference. Then this relationship may be displayed.

As previously mentioned it is often desirable to display data in digital form. Therefore, many signals treated in instrument systems often undergo two changes, one in a logarithm converter and one in a linear digital voltmeter.

There are several disadvantages to the method of a distinct two-step procedure, as just described. First, the accuracy is not good, since the errors of the conversion to logarithm and the digitizing process are additive. Second, both the long term stability and the temperature stability of conventional logarithm conversion systems are notoriously poor. Finally, the cost of converting and subsequent displaying is great.

It is therefore a feature of this invention to provide an improved simultaneous logarithm-digitization of data signals.

It is a further feature of this invention to provide a means for performing, when desired, logarithmic or exponential conversion concurrent with digitization.

It is yet another feature of this invention to provide an improved negative logarithmic or exponential conversion system concurrent with digitization.

It is yet another feature of this invention to provide a selectably operable digital metering system capable of performing either logarithmic conversions or not (leaving the data to be displayed in digital form).

It is still a further feature of this invention to provide a selectably operable digital metering system capable of logarithmic or negative logarithmic conversions and digital displaying with respect to a plurality of compacted and expanded scales.

It is a principal feature of this invention to obtain an improved single-step conversion and digital display circuit having good stability characteristics and producible at costs significantly below prior art devices.

SUMMARY OF THE INVENTION

A preferred embodiment of the present invention comprises two essentially identical comparators, the operations of which are determined by a reference voltage to which logarithmic or exponential relationships are made and by the voltage level of the data to be measured. The comparators, in turn, operate switching circuits that control the on-off operation of a gate through which clock pulses are applied to a counter. The count recorded in the counter while the gate is open may then be transferred to a memory device connectable, in turn, to a display unit.

Negative logarithmic-type conversion is accomplished by making the comparators operable according to the exponentially decaying voltage on a resistor-shunted capacitor. When the circuit is in its reset or initial condition, the voltage on the capacitor decays from a value in excess thereof until it equals the reference voltage, thereby causing the first comparator to produce an output. The second comparator produces an output when the voltage level on the capacitor exponentially decays to equal the applied input data.

A strobe generator periodically transfers the recorded count to the memory. A reset generator allows a new voltage to recharge the capacitor. Hence, the data is logarithmically related or "converted" with respect to the reference voltage and at the same time providing the relationship information in the form of a digital display.

Switching may be provided for allowing operation of the two comparators with respect to ground and the applied voltage (linear digital voltmeter operation). Also, switching may be provided for changing the shunting resistor through which the capacitor discharges, thereby providing for scaling the negative logarithmic conversion. Finally, scaling changes may also be effected by changing the clock rate during a given period of time.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 1 is a block diagram according to a preferred embodiment of the invention.

FIG. 2 is a graphical analysis of operation of part of the embodiment illustrated in FIG. 1.

DESCRIPTION OF PREFERRED EMBODIMENTS

In many analog to digital converters, a capacitor is charged or discharged by a constant current source and the time interval required for the voltage across the capacitor to vary an amount proportional to the voltage being measured is displayed or stored for subsequent data handling. The proportionality constant may be varied such that the displayed or stored value is numerically equal to the measured voltage.

By discharging a capacitor with a fixed resistance instead of a current source, the following equation defines the operation $V_C = V_R = Ee^{-t/RC}$, wherein $V_C$ and $V_R$ equals the voltage on the high side of the parallel capacitor and resistor combination, $E$ is equal to the fixed reference voltage and $C$ and $R$ are respectively the capacitance and resistance values of the capacitor and resistor components.

Taking the natural logarithm of both sides, the following result is obtained:

$$-\ln \frac{V_C}{E} = t/RC.$$

Form this equation, it is evident that a logarithmic digital voltmeter may be built on the basis of a capacitor discharging through a fixed resistance to display digitally a number proportional to the negative logarithm or exponential function of the input voltage by measuring the time required for the capacitor to discharge from a fixed reference voltage, $E$, to the input voltage, proportional to $V_C$. The resistance, capacitance, or the frequency of the clock used to measure the time interval may be varied, or a combination of the three, to provide a proportionality constant which will allow this logarithmic digital voltmeter to read out in meaningful units.

Similarly a capacitor charging from a reference source through a fixed resistance may be used for some functions.

A block diagram of a simultaneous negative logarithmic conversion and digital voltmeter is shown in FIG. 1. The input signal or data is applied to terminal 10, which is amplified in amplifier 12 and applied through one set of contacts 14a of switch 14 to a first input terminal of comparator 16. The input signal may be any signal for which negative logarithmic conversion and digital displaying is desired, such as typically from a spectrophotometer or colorimeter.

Reference voltage applied to the circuit from source 18 is applied through a second set of contacts 14b on switch 14 to a first input terminal of comparator 20. As will be shown later, it is the reference voltage from source 18 which establishes the zero scale value for the voltmeter.

Reset means in the form of a reset pulse generator 22 supplies a periodic signal to close and then open switch 24, thereby permitting a voltage to be supplied through switch 24 to capacitor 26. This voltage must be slightly greater than the reference voltage from source 18. For example, if the reference voltage is 4½ volts, a voltage of 5 volts would be suitable for application to capacitor 26 through switch 24. The opposite side of 26 to which voltage is applied is connected to ground, or other circuit common or neutral level. Capacitor 26 is also shunted by resistor 28 through a third set of contacts 14c on switch 14.

The voltage-applied side of capacitor 26 is also connected to a buffer amplifier 30, the output of which is connected to the second terminals of comparators 16 and 20. In addition, the output of buffer amplifier 30 may be connected to a constant current circuit, such as a current sink 32 and Zener diode 34, and resistor 56 combination.

The output from comparators 16 and 20 are respectively connected to S–R bistable multivibrators or flip-flops 36 and 38. The output of multivibrator 38 is connected as the opening signal of clock counter gate 40 and the output of multivibrator 36 is connected as the closing signal to clock counter gate 40. The gate will function with a reversed operating sequence to facilitate zero adjustments. The output of clock counter gate 40 is applied to a digital counting means in the form of decade counter 42. Memory circuit 44 is connected to strobe generator 50 and display unit 46 is connected to memory circuit 44. The pulses used in counting are applied from an appropriate clock oscillator 48 through a fourth set of contacts 14d on switch 14 to clock counter gate 40. As may be noted, all four sets of the contacts on switch 14 are mechanically ganged together. As illustrated, clock oscillator 48 provides either pulses at 10 kc or 100 kc.

A strobe generator 50 is connected from clock counter gate 40 to memory 44 to cause the decade counter number to be transferred for storage into memory 44 at the time clock counter gate 40 closes. In addition, there is a reset connection from reset pulse generator 22 to decade counter 42.

Finally, a sequential detector 52 may be connected to reset pulse generator 22 and to the outputs from each multivibrator 36 and 38. An indicator 54 may be used to display the signals in sequential detector 52.

In operation, the voltage applied to capacitor 26 charges capacitor 26 such that the output applied through buffer 30 to comparators 16 and 20 is at a level slightly higher than the reference voltage. It is well known that a capacitor discharges exponentially through a shunting resistor, in this case resistor 28. When the voltage from buffer 30 decays to a point at which it is equal to the reference voltage from source 18, the comparator 20 produces an output to flip-flop 38 to change its state. In turn, flip-flop 38 opens clock counter gate 40 to allow pulses from clock oscillator 48 to be applied therethrough to decade counter 42.

As the voltage on capacitor 26 continues to discharge through resistor 28 and lower the input from buffer 30 to comparator 16, eventually it will descend to the level of the signal input supplied from amplifier 12. At this time, there will be an output from comparator 16 which changes the state of flip-flop 36. In turn, flip-flop 36 closes clock counter gate 40, thereby shutting off the application of pulses from clock oscillator 48 to decade counter 42.

Upon the closing of clock counter gate 40, an output is produced to cause strobe generator 50 to shift the count reached in decade counter 42 to memory 44. Strobe generator 50 may be actuated by the closing of the gate which may be the output from an AND circuit which is actuated when both flip-flops 36 and 38 are in their 1 state (opposite from reset condition). Display 46 may then produce a visual presentation of the count that was previously in the decade counter corresponding to the converted logarithmic value of the input signal in digital form.

The reset output from generator 22 resets flip-flops 36 and 38, decade counter 42 and causes another voltage charge to be applied through switch 24 to capacitor 26. It may be seen that the periodicity of generator 22 determines the sampling rate of the applied analog signal.

The reset operation may be observed in association with the opening and closing operation of the gate by sequential detector 52 and indicator 54. The detector merely produces a signal for display purposes each time the signal input comparator 16 is activated before the reference comparator 20 indicating the input signal is outside of the instrument's range.

Operation may be best seen by referring to FIG. 2. The actual initial voltage effectively applied from capacitor 26 to comparator 20 is in excess of the full scale voltage for the meter (voltage from source 18 also applied to comparator 20). When the voltage decays to the full scale voltage level, the comparator output changes to cause counting to begin. When the voltage level decays to a level of the measured voltage the count is discontinued by operating comparator 16, thereby preserving as a digital count the measured time for the voltage on the capacitor to exponentially decay from the reference to the measured level.

The count, if starting with zero at full scale, is actually a measure in terms of an inverse logarithmic conversion. However, it can be made direct if the count starts with a full scale value already in the counter and the counter is made to reduce in value as clock pulses are produced. Alternatively a direct logarithmic valuation may be obtained by measuring the time interval required for the capacitor to discharge from a value proportionate to the input signal to the reference value ($E/10$), full scale (1) being at $E$ and zero scale at ($E/10$).

As previously mentioned, the proportionality constant may be varied by the setting of resistor 28 (switch 14 in mode 3) or by changing the clock rate (switch 14 in mode 4). When the switch is in mode 1, the circuit is a conventional linear ramp-type voltmeter with the input signal applied to comparator 20 (in place of a reference), the first terminal of comparator 16 being connected to ground, and the input to buffer amplifier 30 being connected through a resistor 56 connected to a current sink 32. This provides a linear ramp voltage limited on the low side by Zener diode 34 for controlling the operation of comparators 16 and 20.

Notice also that by use of the current sink and Zener diode combination, constant current values may be added to or subtracted from the voltage on capacitor 26 when the circuit is connected for mode 2 operation, thereby yielding an instrument suitable for direct digital displaying of complex functions in meaningful terms.

While particular embodiments of the invention have been shown, it will be understood that the invention is not limited thereto, since many modifications may be made and will become apparent to those skilled in the art.

What is claimed is:

1. A simultaneous logarithmic conversion and digital display circuit, comprising
   a reference voltage source,
   an analog input voltage source to be logarithmically, digitally displayed,
   a first voltage comparator one input terminal of which is connected to said reference voltage source,
   a second voltage comparator one input terminal of which is connected to said analog input voltage source,
   decaying voltage means operably connected to the second input terminals of said first and second comparators for applying a predetermined voltage thereto, said voltage decaying at an adjustable exponential rate, a current sink connected to the output of said decaying voltage means, a zener diode connected in series with said current sink and connected to the output of said decaying voltage means for providing a means of adding or subtracting linear values from said exponentially decaying voltage output,
   a first bistable circuit operably connected to the output of said first comparator circuit for generating a pulse when said decaying voltage coincides with said reference voltage applied to said first comparator,
   a second bistable circuit operably connected to the output of said second comparator circuit for generating a pulse when said decaying voltage coincides with said analog input voltage applied to said second comparator,
   a pulse generator,
   gate means operably connected to said pulse generator and responsive to said first and second bistable circuits, said output pulse of said first bistable circuit opening said gate means and the output of said second bistable circuit closing said gate means for passing pulses generated by said pulse generator while said gate means is open to perform a digital evaluation of the time interval between the operation of said first and second bistable circuits,
   counting and display means operably connected to said gate means for counting said pulses received from said gate means and visually displaying the recorded count of said pulses, and
   reset means cooperating with said decaying voltage means for reapplying said decaying voltage to said first and second comparators and resetting said first and second bistable circuits and said counting portion of said counting and display means.

2. The circuit described in claim 1, wherein said decaying voltage means comprises
   a capacitor shunted by a variable resistance,
   a predetermined voltage source,
   a switch operable in response to said reset means for applying said predetermined voltage to said capacitor for charging, said capacitor discharging through said variable resistance, the voltage decaying at a predetermined exponential rate, and
   a buffer amplifier operably connected to said variable resistance to receive said decaying voltage and applying said voltage to the inputs of said first and second comparators.

3. The circuit described in claim 1, wherein said counting and display means comprises
   a decade counter operably connected to said gate means for counting the pulses passed by the gate while the gate is open in response to said first bistable output pulse,
   a memory circuit operably connected to said decade counter,
   a strobe generator operably connected to said gate means and actuated upon the closing of said gate means in response to said second bistable output pulse, the output of said generator being applied to said memory to cause the count in said decade counter to shift to said memory upon the closing of said gate means, and
   a visual display means operably connected to said memory for displaying the count shifted to said memory from said decade counter.

4. The circuit as described in claim 1, wherein the circuit is converted from a logarithmical digital circuit to a linear ramp digital circuit, comprising
   means for disconnecting the reference voltage source from said one input terminal of said first comparator and for connecting the analog input signal voltage thereto,
   means for disconnecting the analog input signal voltage from said second comparator and for connecting electrical neutral thereto, and
   ramp voltage means applicable to said first and second comparators for allowing said counting and display means to accumulate pulses during the interval between the occurrence when the ramp voltage equals the input signal and when the ramp voltage equals electrical neutral.

5. The circuit as described in claim 4, wherein said ramp voltage means comprises
   a voltage source for producing a voltage greater than the expected input signal voltage,
   a switch momentarily activated by said reset means for applying the voltage from said source to said second input terminals of said first and second comparators, and
   linear load resistance for allowing the voltage applied to said second terminals of said first and second comparators to linearly reduce to at least said electrical neutral.

* * * * *